United States Patent [19]

Wendt et al.

[11] 3,939,068

[45] Feb. 17, 1976

[54] PROCESS FOR TREATING WASTE WATER CONTAINING CELLULOSE NITRATE PARTICLES

[75] Inventors: Theodore M. Wendt, Franklin; Arthur M. Kaplan, Newton, both of Mass.

[73] Assignee: The United States of America as represented by the Secretary of the Army, Washington, D.C.

[22] Filed: Feb. 4, 1975

[21] Appl. No.: 546,953

Related U.S. Application Data

[63] Continuation-in-part of Ser. No. 422,458, Dec. 6, 1973, abandoned.

[52] U.S. Cl. .................... 210/7; 210/12; 210/16; 210/18; 210/DIG. 27
[51] Int. Cl.$^2$........................................... C02C 1/06
[58] Field of Search ............................. 210/2–7, 11, 210/12, 15, 16, 18, 59, 60, DIG. 27

[56] References Cited

UNITED STATES PATENTS

| | | | |
|---|---|---|---|
| 3,607,736 | 9/1971 | Yusho................................... | 210/11 |
| 3,617,540 | 11/1971 | Bishop et al........................... | 210/16 |
| 3,709,364 | 1/1973 | Savage.................................. | 210/11 |
| 3,801,499 | 4/1974 | Luck..................................... | 210/11 |
| 3,817,857 | 6/1974 | Torpey.................................. | 210/3 |

OTHER PUBLICATIONS

Mudrack, P. V. Eng. Bull. Ext. Ser., 1966 pp. 656–664.

Amant et al. "Methods of Removing Nitrates from Water," J. Agr Food Chem., 1970, pp. 785–788.
Amant et al. "Treatment Of High Nitrate Water," J. A WWA pp. 659–662.

*Primary Examiner*—Charles N. Hart
*Assistant Examiner*—Peter A. Hruskoci
*Attorney, Agent, or Firm*—Nathan Edelberg; Robert P. Gibson; Lawrence E. Labadini

[57] ABSTRACT

Total removal of cellulose nitrate particles from a waste water stream is accomplished by a combination of chemical and biological treatments which result in an effluent having a greatly reduced concentration of nitrogen compounds and having an acceptable BOD. The first step in the process requires that the insoluble, non-biodegradable cellulose nitrate particles be chemically digested with alkali to produce soluble products. Following digestion, the waste stream is supplemented with domestic raw sewage and a microbially utilizable carbon source and the supplemented waste stream is subjected first to an anaerobic microbial denitrification treatment to eliminate the oxidized forms of nitrogen and then to an aerobic microbial treatment to reduce BOD and to oxidize reduced nitrogen compounds. The effluent therefrom is again supplemented with a microbially utilizable carbon source and subjected to a final anaerobic microbial denitrification to remove nitrates present in the waste water resulting from nitrification processes occurring during the aerobic treatment step.

12 Claims, No Drawings

PROCESS FOR TREATING WASTE WATER CONTAINING CELLULOSE NITRATE PARTICLES

The invention described herein may be manufactured, used and licensed by or for the Government for governmental purposes without the payment to us of any royalty thereon.

This is a continuation-in-part of application Ser. No. 422,458, filed Dec. 6, 1973, now abandoned.

BACKGROUND OF THE INVENTION

This invention relates to a process for treating waste water containing cellulose nitrate particles and, more particularly, to a process for the chemical-biological degradation of cellulose nitrates found in waste streams resulting from cellulose nitrate manufacture so as to produce an effluent substantially free of reduced and oxidized forms of nitrogen.

Cellulose nitrate, hereinafter referred to as "nitrocellulose", is produced in large quantities for use in the manufacture of munitions, synthetic finishes and a wide variety of other products, by the reaction of pure cellulose with an excess of nitric acid and a dehydrating agent such as sulfuric acid. In the manufacture of nitrocellulose, the freshly nitrated cellulose material is thoroughly washed with substantial amounts of water to remove excess acid present and this wash water carries, in addition to unreacted acid, a suspension of small particles of insoluble nitrocellulose referred to as "nitrocellulose fines." While the waste water is normally neutralized and treated before flowing into the receiving water, there has, heretofore, been no practical way to eliminate the nitrocellulose fines therefrom, which fines constitute a serious waterway pollutant. Nitrocellulose fines remain in suspension in moving waste streams and receiving waters and this particulate suspension creates a milky appearance in the water, a discoloration that is objectionable from an aesthetic standpoint and one which prevents the use of such waters for domestic consumption or for many industrial uses. Another problem arising from the discharge of nitrocellulose into receiving waters is the likelihood of concentration of these nitrocellulose fines in pools located along stream and river beds which concentrated deposits could suddenly explode should they become dessicated or come into contact with strong oxidizing agents. If filtration were to be employed downstream of such a waste discharge for any purpose, the fines would collect on the filter device to an extent sufficient to constitute a serious hazard.

Attempts to quantitatively separate the nitrocellulose fines from the waste stream output of a producing plant by mechanical means, i.e. sedimentation, filtration and centrifugation have not proved to be fully adequate and even had such efforts beeen totally successful, would pose a further problem with respect to handling and disposing of the concentrated fines in an environmentally acceptable and safe manner. Nitrocellulose, being a thoroughly substituted cellulose compound is not subject to direct microbiological attack and is not broken down by microbes in receiving water systems. Therefore, there exists a need for a method for removing and disposing of these insoluble and non-biodegradable nitrated cellulose products from the waste streams of nitrocellulose producing plants without further reducing the quality of the environment. This invention has as one of its objects the provision of a practical and effective chemical-biological method for disposal of nitrocellulose fines without creating other toxic products. Another object of this invention is to provide a method for the treatment and purification of other polluting waste streams normally found associated with industrial facilities, i.e., raw domestic sewage and water-dry waste streams (typically aqueous waste streams bearing organic liquids or solvents).

SUMMARY OF THE INVENTION

This invention relates to a process for treating a waste water stream containing nitrocellulose fines which requires that the insoluble and non-biodegradable nitrocellulose particles in the waste stream be chemically digested with alkali at a pH of at least 11.5 to convert the insoluble particles to soluble and biodegradable products. The chemically digested waste stream is supplemented with raw domestic sewage and a source of microbially utilizable carbon material and this mixture is subjected to a microbial denitrification procedure to convert available oxidized nitrogen compounds to nitrogen gas. The effluent from the denitrification procedure is next exposed to an aerobic microbial treatment to reduce BOD and to oxidize reduced nitrogen compounds. Effluent from the aerobic microbial treatment is again supplemented with a microbially utilizable carbon source and subjected to a second and final microbial denitrification to convert the oxidized nitrate compounds to nitrogen, producing a waste steam effluent having an acceptable BOD and having a substantially reduced concentration of oxidized and reduced forms of nitrogen.

DESCRIPTION OF THE PREFERRED EMBODIMENT

Waste water streams discharged from nitrocellulose manufacturing plants typically contain a suspension of fine, insoluble and non-biodegradable nitrocellulose particles which are present in concentrations that usually range from about 50 ppm to about 500 ppm. These same waste streams, whether or not neutralized prior to entry into receiving waters, also contain substantial quantities of nitrate ions from the nitric acid used in the manufacturing process which are also a significant waterway pollutant in that such oxidized forms of nitrogen fertilize water bodies encouraging the rapid growth of algae and the concomitant depletion of dissolved oxygen therein. Nitrate ions can, of course, be removed from water streams by known methods but removal of nitrocellulose fines by any acceptable method has long defied those skilled in the art. The present invention employs a series of chemical and biological steps which produce a final effluent free from nitrocellulose particles and substantially free of reduced and oxidized nitrogen compounds, all of which are polluting to receiving waters. This process not only serves to eliminate nitrocellulose as a pollutant, but, as will be disclosed hereinafter, utilizes both domestic raw sewage and water-dry waste streams in the process thereby eliminating the need for separate waste treatment facilities and procedures to dispose of such materials.

Initially, the nitrocellulose containing waste stream, containing a heavy nitrate ion concentration, is reacted with an alkaline material, preferably sodium hydroxide to chemically digest the insoluble nitrocellulose particles to produce soluble products. The efficiency of the digestion step is dependent on time of contact, temperature of digestion, pH of the solution, and the particular alkaline compound employed. The time required for digestion decreases with increasing temperatures and/or with increasing pH. While other alkaline materials, such as sodium bicarbonate, sodium carbonate, ammonium hydroxide and barium hydroxide, may be employed, sodium hydroxide is preferred both for its digestion efficiency and for economic considerations. Digestion can proceed at temperatures as low as 25°C. but preferably the temperature of the digesting solution ranges from 60°C. to 90°C. with even higher temperatures resulting in more rapid digestion but becoming economically impractical. For complete digestion of nitrocellulose, the pH must be maintained at or above 11.5 throughout the digestion. For samples of nitrocellulose suspended in distilled water, 2.5–3.0% NaOH is sufficient to digest a 5% slurry. If acidic or heavily buffered waters are used to suspend the nitrocellulose, more NaOH will be required, the amount above 2.5–3.0% being determined by the acidity or buffering capacity of the liquid. If pH is allowed to fall appreciably below 11.5 during digestion, incomplete disruption of the nitrocellulose results, leaving an insoluble residue which is not biodegradable. The end point of the digestion step is reached when the insoluble particles of the nitrocellulose have completely disappeared and have been converted to soluble products. Experimental evidence indicates that digestion does not proceed stepwise with initial denitration followed by disruption of the cellulose backbone, but rather is an all or none decomposition of entire nitrocellulose subunits. The digested solution contains along with the high nitrate load, soluble organic nitrogen compounds and other non-nitrogen containing organic compounds. The $BOD_5$ (5 day Biochemical Oxygen Demand) for a digested solution obtained from a 5% slurry of nitrocellulose in distilled water typically ranges from about 200 mg/l to 450 mg/l.

When digestion of the nitrocellulose fines is completed, as evidenced by the total absence of insoluble particles of nitrocellulose, the solution is then neutralized to a pH within the range of from about 6.0 to about 9.0 and preferably to a pH of 6.5 to 8.0. While any mineral acid may be used to effect neutralization, sulfuric acid or nitric acid are preferred.

Following digestion and neutralization, the waste stream is supplemented with domestic raw sewage and a microbially utilizable carbon source, hereinafter carbon/energy source. Domestic raw sewage, sometimes referred to as municipal waste waters, typically have a $BOD_5$ of from 100–200 mg/l and contain organic nitrogen compounds (10 to 25 mg/l), and nitrate (0 to 0.5 mg/l). The carbon/energy source should have a high $BOD_5$ value, preferably of the order of 2,000–3,000 mg/l, and suitable for this purpose, for example, are such organic materials as methanol, ethanol, acetone, glucose, acetic acid, sugar and mixtures thereof. These carbon materials constitute an energy source and function as an electron donor in certain of the process steps that follow. Methanol, ethanol and acetone are frequently waste products of many industrial processes and are components of so-called water-dry wastes arising from the manufacture of nitrocellulose. While the addition of raw sewage is not essential to the treatment process of this invention, it provides a source of trace minerals and acts as a diluent and can conveniently be treated along with the digested nitrocellulose waste stream and thereby obviate the need for a separate procedure to purify the sewage stream. It is essential that the raw sewage or other diluent, such as river or lake water be added in an amount sufficient to reduce the nitrate content of the resulting solution (or mixed liquor) to less than 200 ppm. At levels above 200 ppm, inhibition of the biological denitrification process occurs. The carbon/energy source is required for the process of this invention and the exact amount will be determined by the biological requirements of the treatment procedure to be discussed below.

The chemically digested nitrocellulose solution, supplemented with raw sewage and a carbon/energy source is exposed to a series of biological treatments consisting of an anaerobic microbial denitrification step followed by an aerobic microbial activated sludge treatment and a final anaerobic microbial denitrification step to produce a solids-free effluent, substantially free of oxidized and reduced forms of nitrogen and having an ecologically acceptable low BOD value. Microbial denitrification is that process whereby oxidized nitrogen compounds, e.g., nitrates and nitrites, are reduced to molecular nitrogen which leaves the system as a gas. This reduction is brought about by certain bacteria which are able, in the absence of oxygen, to utilize nitrates and nitrites in place of oxygen to oxidize available and microbially utilizable organic compounds. In the chemical reaction characterized by this microbial process, nitrates and nitrites serve as terminal electron acceptors and the assimilable or microbially utilizable carbon compounds serve as electron donors. Since the purpose of this microbial denitrification is to eliminate all oxidized nitrogen compounds, it is essential that there be available an excess of the carbon/energy source to insure that the denitrification goes to its theoretical completion and that there be sufficient additional carbon available for bacterial growth. The amount of carbon required can be readily calculated stoichiometrically and where methanol is the carbon source, 3 mg/l of methanol will adequately reduce 1 mg/l of nitrate and provide sufficient carbon for bacterial growth. Carbon source supplementation is essential to compensate for carbon and BOD deficiencies in both the digested nitrocellulose waste and the domestic sewage. Denitrification can be carried out in a conventional tank of suitable size using activated sludge as a source of suitable denitrifying bacteria or relying on the bacteria normally present in the raw sewage and holding the mixed liquor under essentially anaerobic conditions. The time required for denitrification will depend on the concentration of nitrates, the temperature of the liquor within the tank, the dissolved oxygen content, the population of denitrifying bacteria and the concentration of available microbially utilizable carbon material. None of the foregoing conditions is critical except that the dissolved oxygen concentration must be below that normally required for aerobic microbial growth and the temperature of the liquor should not drop below that at which the bacteria can efficiently denitrify the nitrates. Many common facultative bacteria are able to effect denitrification, including members of the genera Pseudomonas, Bacillus, and Achromobacter. Suitable denitrifying bacteria will be present in any activated sludge mass material or raw sewage material. After denitrification is completed, solids in the liquor are allowed to settle either in the same vessel or in a separate sedimentation vessel. Following sedimentation, the clear effluent is removed and the solids remaining are recycled for further denitrification.

The effluent from the foregoing denitrification (primary denitrification) is subjected to an aerated activated sludge treatment or other aerobic microbial process to reduce BOD, to break down nitrogen bearing organic compounds and oxidize reduced nitrogen compounds to nitrates and nitrites. In this step of the treatment process, activated sludge is mixed with the effluent from the primary denitrification and aerated to maintain an aerobic system. A dissolved oxygen concentration in excess of 2 mg/l is necessary to permit microbial break down of organic compounds not degraded in the primary denitrification step. Nitrifying bacteria normally present in the sludge or in the raw sewage oxidize reduced nitrogen compounds such as ammonia to nitrates and nitrites and this nitrification requires a minimum temperature of 7°C., pH from about 6 to about 9 and a significant population of nitrifying bacteria such as species of Nitrobacter and Nitrosomonas in the activated sludge. This stage of the purification process will reduce the BOD of the mixed liquor to an acceptable level and will oxidize substantially all of the available reduced nitrogen compounds.

After the activated sludge treatment has gone to completion, the mixed liquor therefrom is transferred to a secondary denitrification vessel and again held under anaerobic conditions to microbially denitrify oxidized nitrogen compounds resulting from nitrification processes occurring during the aerated activated sludge treatment. Any available nitrates and nitrites are reduced to molecular nitrogen by the denitrifying bacteria present in the system in the same manner and under essentially the same conditions as set forth for the primary denitrification step. Because of the depletion of a carbon/energy source, it is necessary to supplement the liquor with a suitable carbon/energy source to permit denitrification of all of the oxidized nitrogen species. Effluent from the secondary denitrification flows into a sedimentation tank and upon settling, the sludge is returned to the aerated activated sludge vessel and the purified effluent is discharged to the receiving waters.

The foregoing process which may operate in either a batch or continuous mode efficiently and effectively removes from 95 to 99% or better of the nitrate content in the initial waste stream, 100% of the nitrites and up to 95% of the ammonia content and the $BOD_5$ content is reduced from 80 to 90% of that influent going into the primary denitrification vessel. In addition, the foregoing process is suitable for treating any waste stream having a high $BOD_5$ (in excess of 150 mg/l), high organic nitrogen (in excess of 10 mg/l) and high nitrate (in excess of 150 mg/l) load. The following example illustrates in detail one specific embodiment of the process of this invention. While process parameters are set forth in this example in considerable detail, it should be understood that there is no intention here to limit the invention to the specific parameters disclosed. On the contrary, the intention is to cover all modifications falling within the spirit and scope of the invention as expressed in the appended claims.

EXAMPLE

A nitrocellulose waste water was created by suspending 20 gm of finely divided nitrocellulose of gun cotton quality (12.6 – 13.4% N) in 400 ml of water. 12 gm of sodium hydroxide was added to the suspension, producing a 3% sodium hydroxide concentration having a pH above 12.0 and the alkaline suspension with stirring was heated to 95°C. and held at this temperature for 20 minutes which was sufficient to completely eliminate all insoluble particles of nitrocellulose. After cooling and neutralizing with concentrated sulfuric acid (about .75 – .95 ml) to pH 6.5 – 7.0, the alkaline digested nitrocellulose solution was diluted with water to 2 liters. This neutralized nitrocellulose digest contained 1600–1700 mg/l nitrate and about 660 mg/l sulfate.

This digest was continuously fed into a primary denitrification vessel at the rate of 250 ml/24 hrs and concurrently therewith domestic raw sewage and a carbon/energy source consisting of a 0.3% glucose solution were fed into the same vessel at rates of 2500 ml/24 hrs for the sewage and 80 ml/24 hrs for the glucose solution. The combined influent going into the primary denitrification vessel had a pH of 8.4 and contained 160–170 mg/l nitrate, 2.4 mg/l of nitrite, and 16.7 mg/l of ammonia and 0.1 mg/l of dissolved oxygen and the system was kept anaerobic by maintaining a blanket of nitrogen gas in the head space within the 1500 ml vessel. The contents of the primary denitrification vessel were maintained at ambient temperatures, about 22°C. Since the system is a continuous one, effluent is discharged from the primary denitrification vessel to a sedimentation tank where most of the solids separate out and are returned to the primary denitrification vessel. The effluent from this sedimentation tank now has a nitrate content of less than 5 mg/l and a nitrite content of 0.6 mg/l and was fed into a vigorously stirred and aerated activated sludge vessel wherein the dissolved oxygen content was increased to 8.0 mg/l. The contents of this vessel were maintained at ambient temperatures. In this vessel, there are provided those conditions necessary for the aerobic microbial break down of organic materials remaining after primary denitrification and also nitrification which involves the microbial break down of nitrogen-bearing organic compounds and subsequent oxidization of the available reduced nitrogen species. Following the aerated activated sludge treatment, the nitrate content of the liquor was increased to 80-100 mg/l and the ammonia content lowered from an initial 16.7 mg/l to about 1.7 mg/l. Effluent from the activated sludge vessel is fed directly into a secondary denitrification vessel and is supplemented with 80 ml of 0.2% glucose solution/24 hrs and is maintained under anaerobic conditions at ambient temperatures. The dissolved oxygen content of this effluent is reduced in the secondary denitrification vessel through the oxygen demand of the microorganisms metabolizing glucose and is lowered to a value of 0.2 mg/l. Thereafter, the denitrifying bacteria reduce available nitrates and nitrites in this vessel to molecular nitrogen with glucose providing the requisite electron donor for denitrification. The effluent from the secondary denitrification step is fed into a secondary sedimentation vessel and the separated solids or sludge returned daily to the activated sludge vessel. The effluent from the secondary sedimentation vessel has nitrate content of 7–8 mg/l or less, no detectable nitrites and less than 1 mg/l of ammonia. The $BOD_5$ of this effluent is 27.3 mg/l which amounts to an 88% reduction in BOD. The overall nitrate removal, including the nitrate due to nitrification in the activated sludge vessel, brought about by this process was at least 97%.

We claim:

1. A process for treatment of a waste stream from nitrocellulose manufacture containing at least 50 ppm of insoluble, non-biodegradable nitrocellulose material which comprises the following steps taken in sequence:
a. chemically digesting by reacting with alkali at a pH of at least 11.5 said insoluble nitrocellulose material in said waste stream to convert said insoluble material to soluble and biodegradable organic and nitrate products,
b. neutralizing said waste stream upon completion of said chemical digestion to a pH within the range of about 6.0 to 9.0,
c. combining said neutralized waste stream with domestic raw sewage and with a microbially utilizable carbon material to form a mixed liquor, said raw sewage added in sufficient quantity to reduce the nitrate content of the mixed liquor to less than 200 ppm and said carbon material added in sufficient quantity to sustain microbial denitrification of substantially all nitrates in the mixed liquor,
d. microbially denitrifying said liquor to convert the nitrate content of said mixed liquor to nitrogen gas, and thereafter separating solids from said liquor,
e. subjecting the solids-free liquor from step (d) to an aerobic microbial treatment to break down the organic products and to convert reduced nitrogen compounds present in said liquor to nitrates, and
f. microbially denitrifying the effluent from step (e) to reduce the nitrate compounds to nitrogen gas and to provide a substantially nitrate-free effluent having an ecologically acceptable BOD level.

2. A process according to claim 1 wherein said insoluble nitrocellulose material is digested with alkali at a temperature of at least 60°C.

3. A process according to claim 2 wherein sufficient microbially, utilizable carbon material is added to the denitrifying step (f) to sustain denitrification of substantially all nitrates in said final denitrification step.

4. A process according to claim 3 wherein after microbial denitrification in step (f) any remaining solid products are allowed to settle and this solid material is then combined with the material undergoing the aerobic microbial treatment of step (e).

5. A process according to claim 4 wherein after microbial denitrification step (d) solids are separated and returned for further denitrification in step (d).

6. A process according to claim 5 wherein the microbial utilizable carbon material is selected from the group consisting of methanol, ethanol, acetone, sugar, glucose, acetic acid and mixtures thereof.

7. A process according to claim 6 wherein microbial denitrification occurs in an anaerobic activated sludge system and the aerobic microbial treatment occurs in an aerated activated sludge system.

8. A process for the treatment of waste water from nitrocellulose manufacture containing at least 50 ppm of nitrocellulose fines which comprise the following steps in sequence:
a. treating said waste water containing insoluble, nonbiodegradable nitrocellulose fines with alkaline material at a pH of at least 11.5 to digest said nitrocellulose to soluble organic and nitrate products and then neutralizing the alkaline waste water to a pH within the range of about 6.0 to 9.0,
b. combining the neutralized nitrocellulose digested waste water with domestic raw sewage and with a microbially utilizable carbon material to form a mixed liquor, said raw sewage added in an amount sufficient to reduce the nitrate content of the mixed liquor to less than 200 ppm and said carbon material added in an amount sufficient to sustain microbial denitrification of substantially all nitrates in the mixed liquor,
c. microbially denitrifying said mixed liquor under conditions in which there is insufficient oxygen to satisfy the microorganisms in the mixed liquor to convert the nitrate content of said mixed liquor to nitrogen gas, and thereafter separating solids from said liquor,
d. aerating said denitrified mixed liquid at a rate and for a time sufficient to cause aerobic microbial reduction of the organic products and to convert reduced nitrogen compounds present in said liquor to nitrates, and
e. combining said mixed liquor from step (d) with a microbial utilizable carbon source and microbially denitrifying this mixture under conditions in which there is insufficient oxygen to satisfy microorganisms in the mixture to convert the nitrate compounds to nitrogen gas and providing a substantially nitrate-free effluent having an ecologically acceptable BOD.

9. A process for the treatment of waste water containing nitrocellulose fines according to claim 8 wherein a microbially utilizable carbon source is added to the mixed liquor from the aeration step in sufficient quantity to sustain microbial denitrification of substantially all nitrates in the final denitrification step.

10. A process for the treatment of waste water containing nitrocellulose fines according to claim 9 wherein after denitrification step (c), the solids in the liquor are allowed to separate and are returned for further denitrification in step (c) and after denitrification step (e) the solids are allowed to settle and are then combined with the material undergoing the aerobic microbial treatment.

11. A process for the treatment of waste water containing nitrocellulose fines according to claim 10 wherein the microbially utilizable carbon material is selected from the group consisting of methanol, ethanol, acetone, sugar, glucose, acetic acid and mixtures thereof.

12. A process for the treatment of waste water containing nitrocellulose fines according to claim 11 wherein the alkaline material is sodium hydroxide.

* * * * *